United States Patent

Ohmura et al.

[11] Patent Number: 5,587,248
[45] Date of Patent: Dec. 24, 1996

[54] CORROSION RESISTANT NICKEL PLATING STEEL SHEET OR STRIP AND MANUFACTURING METHOD THEREOF

[75] Inventors: Hitoshi Ohmura, Yamaguchi-ken; Yasuhiro Koyakumaru; Satoshi Iketaka, both of Kudamatsu, all of Japan

[73] Assignee: Toyo Kohan Co., Ltd., Tokyo, Japan

[21] Appl. No.: 400,387

[22] Filed: Mar. 3, 1995

Related U.S. Application Data

[63] Continuation of Ser. No. 78,920, Jun. 21, 1993, abandoned.

[30] Foreign Application Priority Data

Jun. 22, 1992  [JP]  Japan ................... 4-188628

[51] Int. Cl.⁶ ................... C25D 5/26; B32B 15/01
[52] U.S. Cl. ................... 428/610; 428/679
[58] Field of Search ................... 428/610, 679, 428/680; 205/176

[56] References Cited

U.S. PATENT DOCUMENTS

| | | | |
|---|---|---|---|
| 2,115,750 | 5/1938 | Rubin et al. | 205/138 |
| 3,325,259 | 6/1967 | Mayer et al. | 428/610 |
| 4,013,488 | 3/1977 | Ramqvist | 428/679 |
| 4,191,617 | 3/1980 | Hurley et al. | 205/176 |
| 4,604,169 | 8/1986 | Shiga et al. | 205/176 |
| 4,910,096 | 3/1990 | Junkers et al. | 428/610 |
| 5,312,697 | 5/1994 | Kiser et al. | 428/679 |

FOREIGN PATENT DOCUMENTS 61-235594  10/1986  Japan .
3166388   7/1991   Japan .

OTHER PUBLICATIONS

Lowenheim, "Electroplating", TS 670, L67, 1978 pp. 211–224. (no month).

"Handbook of Chemistry and Physics", 54th edition, QD 65.04, 1973 pp. B–113. (no month).

Primary Examiner—Ngoc-Yen Nguyen
Attorney, Agent, or Firm—Browdy and Neimark

[57] ABSTRACT

According to the present invention, there is provided a corrosion-resistant nickel plated steel sheet or strip comprising base sheet made of a cold rolled steel sheet or strip and a nickel layer plated on at least one side thereof; in which a part or all of the nickel plated layer forms Fe–Ni diffusion layer; moreover, exposure rate of iron on a surface of the nickel plated layer is 30% and below.

3 Claims, 1 Drawing Sheet

CORROSION RESISTANT NICKEL PLATING STEEL SHEET OR STRIP AND MANUFACTURING METHOD THEREOF

This application is a continuation of application Ser. No. 08/078,920, filed Jun. 21, 1993, now abandoned.

BACKGROUND OF THE INVENTION

The present invention relates to a nickel plated steel sheet or strip featuring excellent corrosion resistance and plating adhesiveness, and a manufacturing method thereof. Specifically, this invention concerns highly corrosion-resistant nickel plated steel sheet or strip suitable for electric/electronic parts, such as battery cells, and stationery, such as ring binders and other materials, and its manufacturing method.

A barrel plating method has been used, but the method has disadvantages of poor productivity and poor uniformity of coating thickness.

In order to solve these problems, a method by which a steel sheet is pre-plated with nickel and pressed later has been replaced by the barrel plating method.

Moreover, in order to improve corrosion resistance of a nickel plated steel sheet, heat-treatment after nickel plating has been proposed by U.S. Pat. No. 2,115,750, for example. The specification of the U.S. patent states only that it is desirable if the thickness of a diffused layer formed by heat-treatment is less than the thickness of nickel plating before heat-diffusion.

TOKUKAI SHO 61 (Japanese Unexamined Patent Publication 1986) 235594 discloses a nickel plated steel sheet with a coating weight of 9–62 $g/m^2$ per side is heat-treated so as to form a Ni–Fe alloy layer of 4 μm or less.

However, in the above-mentioned U.S. Pat. No. 2,116,750 and TOKU KAI SHO 61-235594, the relation between the whole plating layer and an alloy layer is not clearly described. Especially in relation to plating thickness, the lower limit of the thickness of a Fe–Ni alloy layer is not specified.

In the TOKU KAI SHO 61-235594, the upper limit of diffusion layer thickness is limited to 4 μm or less, as mentioned before. However, for instance, if the plating thickness is 9 $g/m^2$, and a Fe–Ni alloy layer is 4 μm, the Fe–Ni alloy layer becomes too thick in comparison with the thickness of nickel plating.

Therefore, it is thought that iron in base sheet is diffused and exposed up the surface of the plated layer. If iron is excessively diffused and exposed up to the surface of a plated layer as mentioned before, there is the disadvantage of corrosion resistance degrading.

On the other hand, in case of U.S. Pat. No. 2,115,750, a lower limit of diffusion thickness is not described. Our experimental results showed that when a diffusion thickness is too thin for a plating thickness, sufficient plating adhesiveness and improved corrosion resistance cannot be obtained.

Furthermore, TOKUKAI HEI 3 (Japanese Unexamined Patent Publication) 166388 discloses a method of heat-treatment after nickel plating in which a so-called re-plating method is proposed, whereby a steel sheet is plated with nickel (1.5–9.0 $g/m^2$) and the nickel plated layer is totally changed to a Fe–Ni alloy layer by heat-treatment, then plated with nickel again.

However, the thickness of the diffusion layer becomes too thick for a plating thickness by this method. In this method, a re-plated layer is hard and non-ductile. Consequently the hard and non-ductile plating layer is to be formed on a Fe–Ni alloy layer, which causes cracks in the plated layer, and moreover, lead to cracks in the Fe–Ni diffusion layer. Due to the cracks, improvement of corrosion resistance is impaired and the re-plated layer does not adhere well to the plating layer. As described above, the conventional technology of heat-treatment after nickel plating does not clearly explain the relation between the thickness of nickel plating and the thickness of a Fe–Ni diffusion layer formed by heat-treatment.

Corrosion resistance is influenced by the quantitative proportion of a Fe–Ni diffusion layer to a thickness of nickel plating. That is, if the thickness of a Fe–Ni diffusion layer is too thick for the plating thickness, corrosion resistance might not be improved, and conversely might be deteriorated when compared with a nickel plated steel sheet or strip not subjected to heat-treatment following nickel plating.

This invention aims to specify the relation between the plating thickness and the thickness of a diffusion layer, and thereby, to provide a nickel plated steel sheet or strip with superior corrosion resistance and plating adhesiveness, and a manufacturing method thereof.

SUMMARY OF THE INVENTION

According to the present invention, there is provided a corrosion-resistant nickel plated steel sheet or strip comprising a base sheet made of a cold rolled steel sheet or strip and a nickel layer plated on at least one side thereof and in which a part or all of the nickel plated layer forms a Fe–Ni diffusion layer. Moreover, the exposure rate of iron on a surface of the nickel plated layer is to be 30% or less.

In the above-mentioned plated steel sheet or strip, a nickel-cobalt strike plating layer is preferably formed between the nickel plated layer and the cold rolled steel sheet or strip.

Furthermore, according to a second aspect of the present invention, a manufacturing method for a corrosion-resistant nickel plated steel sheet or strip is provided by plating at least one side of the base sheet with 1–5 μm of nickel, and then heat-treating to form a Fe–Ni diffusion layer at a temperature higher than nickel re-crystallization and resulting in an exposure rate of iron on the surface of the nickel plated layer at 30% or less.

In the above-mentioned nickel plated steel sheet or strip, a nickel plating layer 1–5 μm in thickness, and a Fe–Ni diffusion layer 0.3–15 μm in thickness are preferred.

In the above-mentioned nicked plated steel sheet or strip, the nickel plated steel sheet or strip in which the ration of thickness of Fe–Ni diffusion layer to the original nickel plating layer is preferably in the range 10–333%.

In the above-mentioned method, a nickel strike plating or nickel-cobalt alloy strike plating is preferably formed as a pre-treatment for the nickel plating.

BRIEF DESCRIPTION OF DRAWING

Hereinafter, several embodiments are explained with reference to the attached drawing as follows.

DETAILED DESCRIPTION OF THE INVENTION

Figure 1:
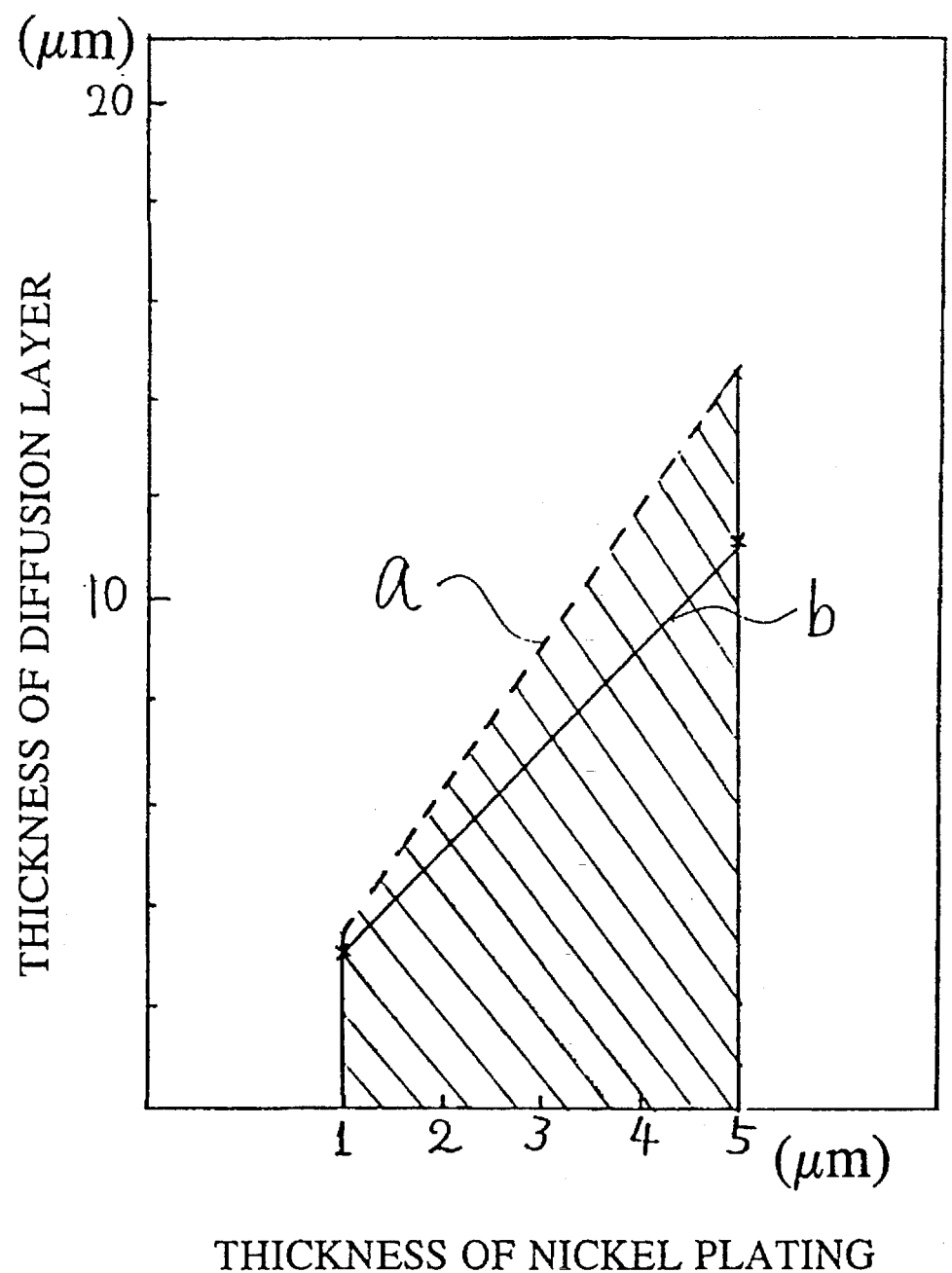
FIG. 1 is a graph showing the relation between thickness of nickel plating and thickness of Fe–Ni diffusion layer, and the broken line (a) shows thickness of a Fe–Ni diffusion layer when the exposure rate of iron reaches 30%, and the full line (b) shows the thickness of a Fe–Ni diffusion layer when iron appears on the surface.

This invention will be described in detail below.

Base sheet:

A low-carbon aluminum killed continuous cast steel is usually employed for a base sheet. In addition, an ultra-low carbon steel with a carbon content of 0.003% by weight or a further addition of titanium or niobium as a non-aging element can be used. After the above steel is cold-rolled, the steel sheet is electrolytically degreased and batch or continuously annealed, followed by being skin-passed before nickel plating.

Pre-treatment of Nickel Plating:

As regards the pre-treatment of nickel plating, the details are well known, that is, a base sheet is degreased electrolytically by alkali or soaked in alkali, then rinsed and pickled chemically or electrolytically by an acidic solution such as sulfuric or hydrochloric acid. A base steel is rinsed and then followed by nickel plating.

The above-mentioned conventional methods are sufficiently effective for pre-treatment. However, in order to improve corrosion resistance as well as plating adhesiveness, it is desirable to provide a nickel strike plating or a nickel-cobalt alloy strike plating after pickling, or as a replacement for a pickling.

In the case of electrogalvanizing or electrotinning, sufficient plating adhesion between a base sheet and a plated layer can be obtained when a surface of base sheet is activated at a lower pH level of 3 or less in the above-mentioned plating bath.

However, in the case of nickel plating, a base sheet surface cannot be activated efficiently in a nickel plating process, because the pH of a nickel plating bath is usually at a relatively high level of 4–5.

In order to increase the adhesiveness, this invention preferably proposes strike plating where nickel or nickel-cobalt alloy strike plating is carried out on a base sheet so as to activate a surface by removing an iron oxide layer, and then precipitating a nickel or nickel-cobalt alloy on a base sheet before subsequent nickel plating. The strike plating provides an anchoring effect of coating adhesion to nickel plating, and prevents pinholes from occurring in the nickel plated layer.

For the strike plating, a well-known Wood's nickel strike bath, which is most commonly used for activating stainless steel prior to nickel plating, may be used. However, a strike plating bath composed of nickel sulfate is preferably used in the present invention. In contrast, nickel chloride is used in Wood's nickel strike bath. As a result of many investigations, it was found that the following bath composition as well as the following condition are preferable. The detail description is as follows:

(1) Composition nickel sulfate: 100–300 g/l, boric acid: 20–40 g/l, or adding 20–50 g/l of nickel chloride to the above-mentioned solution. pH: 1–2 adjusted by adding sulfuric acid, bath temperature: 35°–50° C.

(2) Composition cobalt sulfate: 5–50 g/l, nickel sulfate: 100–300 g/l, boric acid: 20–40 g/l.

When the above-mentioned (1) and (2) baths are employed, a base sheet is cathodically processed under the condition of 5–100 coulombs at a current density of 5–50A/dm$^2$.

In addition, a nickel pellet or a nickel plate is used as an anode. By this method, a strike-plated layer with 10–50% cathodic deposition efficiency and 10–40% cobalt/nickel ratio can be obtained.

The Effect of the Constituents are as Follows:

Nickel sulfate and cobalt sulfate supply Ni ions and cobalt ions respectively, boric acid acts as a pH buffer, and nickel chloride accelerates the dissolution of the anode. With regard to the bath pH, a pH range of about 1–2 is suitable for corrosion resistance as well as plating adhesion. Strike-plating is carried out in accordance with the above-mentioned method, then rinsed with water before proceeding to the nickel plating process.

Plating Process:

A steel sheet is plated with nickel after the above-mentioned plating pre-treatment, or preferably, after nickel strike plating or nickel-cobalt alloy strike plating. In general, a nickel sulfate bath called a Watt bath is mainly used as a nickel plating bath. Besides the above mentioned bath, a sulfamine acid bath, a boric fluoride bath or a chloride bath can also be used for this application. With regard to plating, the thickness should be in the range of 1.0–5.0 μm. When the plating thickness is less than 1.0 μm, sufficient corrosion resistance cannot be obtained.

On the other hand, the maximumplating thickness of 5.0 μm in the present invention is determined by economics when considering the effect on corrosion resistance versus the cost.

There are three types of nickel plating.

They are:
(1) Non-bright nickel plating
(2) Semi-bright plating: Organic compound called leveling agent is added, which smooths out a surface of precipitated structure.
(3) Bright plating: In addition to leveling, a bright agent is added which usually contains a sulfur element that has the effect of making deposited precipitated grain fine.

Bright plating by a bath comprising a sulfur element is not desirable for the nickel plating of this invention. The reason is that embrittleness, caused by the heat-diffusion treatment of the process following nickel plating, is due to the above-mentioned organic compound comprising a sulfur element.

A typical plating condition in the present invention is as follows:

Composition of the bath: nickel sulfate 250–350 g/l, nickel chloride: 30–50 g/l, and boric acid: 30–50 g/l, pH: 4.0–4.6, temperature: 50°–65°C., current density: 5–50A/dm$^2$ Heat-Treatment Process:

The steel sheet is subsequently treated to a heat-diffusion process after nickel plating. The purposes of this heat-treatment is to soften and re-crystallize the plated layer composed of fine grain structure generated by the nickel plating process, and to improve the adhesiveness between the base sheet and the plated layer. In this heat-treatment, the thickness of a Fe-Ni diffusion layer should be controlled so that the Fe/Ni ratio is within the range of 30% or less on the surface.

The reason that the range of thickness of the Fe-Ni layer should be limited in this invention is that when the Fe/Ni ratio exceeds 30%, the corrosion resistance substantially decreases as the exposure rate of iron increases.

Moreover, it is important in this invention that heat-treatment should be performed under conditions where the plated layer is re-crystallized. The plated layer is softened due to stress release by heat-treatment even at a temperature as low as 300° C. for instance. Re-crystallization and formation of an Fe–Ni diffusion layer are not however achieved at such low temperature.

Merely softening the plated layer does not assure sufficient ductility. Furthermore, flaking may possibly occur in press forming at the end use. Flaking is defined as the peeling of a plated layer from a base sheet. In that case, corrosion resistance decreases naturally. The minimum heating temperature and time for re-crystallizing is determined as follows. First, nickel foil of 50 μm thickness is plated on stainless steel, then peeled off the steel and heat-treated. As a result, it was found that re-crystallization occurred over 450° C. and its heating time required 8 hours.

Re-crystallization lead to remarkable ductility in a plated layer. For instance, though elongation of a plated foil is only 2% in the plated layer, the elongation becomes more than 30% in a re-crystallized foil. The thickness of the Fe–Ni diffusion layer is controlled in accordance with the functions of the heat-treatment temperature and the heat-treatment time. For details, the thickness of a Fe–Ni diffusion layer is determined by the following expressions 1 and 2.

$$W=k(Dt)^{\frac{1}{2}} \quad (1)$$

where W:
the thickness of a Fe–Ni diffusion layer,
k: proportional constant,
t: heat-treatment time
D: diffusion coefficient.

In addition, k in expression 1 is determined in the following expression 2.

$$D=D_o exp(-Q/RT) \quad (2)$$

where
$D_o$: frequency term,
Q: activation energy (kcal/mol),
R: gas constant,
T: absolute temperature.

Acta Metallurgica, vol. 19, May 1961 (page 440) shows some experimental examples relating to the diffusion coefficient. From a preliminary test in order to determine proportional constant k in expression 1, we obtained W=7.5 μm when heat-treatment was conducted at 650° C. for 5 hours. If you substitute W=7.5 μm into expression 1, you can obtain the proportional constant k. Substituting k into expression 1, the thickness of a diffusion layer can be calculated for a given absolute temperature and a heat-treatment time using expressions 1 and 2.

Many samples with various Fe/(Fe+Ni) ratios were prepared and the diffusion layer thickness and the Fe/(Fe+Ni) ratios were measured as follows: the thickness of a Fe–Ni diffusion layer was determined by Glow Discharge Optical Emission Spectrometry and a Fe/(Fe+Ni) ratio was measured by Auger analysis method.

The results of that investigation are shown in FIG. 1 which reveals a relationship between nickel plating thickness and the thickness of the diffusion layer.

In FIG. 1, the full line (b) shows the relationship between a measured thickness of nickel plating (X-axis) and a measured thickness of a diffusion layer (Y-axis). The thickness of the diffusion layer shows the case when iron just comes to the surface of a plated layer. The full line (b) shows that the diffusion layer becomes proportionately thicker as the thickness of the nickel plating increases.

Further, FIG. 1 shows that a double layer, composed of a diffusion layer and a ductile nickel layer on the diffusion layer, can be produced under a condition where the diffusion thickness does not achieve the thickness represented by line (b) at a specified thickness of nickel plating.

On the contrary, you can increase the amount of iron on the diffusion layer by continuing heat-treatment even after iron reaches the surface. Furthermore, corrosion resistance of each sample was investigated. As a result, sufficient corrosion resistance was obtained when a ratio of iron coming up to the surface is within the specified limit. From those experiments, corrosion resistance is considered to be excellent when the Fe/(Fe+Ni) ratio on the surface, in other words, a ratio of iron on the plating surface in which iron and nickel co-exist, is within the range of 30% or less.

The broken line (a) in FIG. 1 represents 30% of the Fe/(Fe+Ni) ratio. And the oblique-lined area in FIG. 1 shows the range of a preferred embodiment of this invention. This is an enclosed range in which the thickness of nickel plating range from 1 μm to 5 μm and the thickness of diffusion layer is under the line. In the meantime, there are two types of heat-treatment methods, one is box-type annealing, the other one is continuous annealing. Either is suitable for this invention. For box-type annealing, a steel sheet is heat-treated at a temperature of 500° to 650° C., with a soaking time of 6 to 8 hours. For continuous annealing, a steel sheet is heat-treated at a temperature of 650° to 800° C. with a soaking time of 30 seconds to 2 minutes.

The steel sheet is heat-treated in non-oxidation protection gas atmosphere or reduction protection gas atmosphere. Furthermore, a specified protection gas heat-treatment is preferably used for box-type annealing. This specified protection gas consists of 75% hydrogen and 25% nitrogen produced by an ammonia crack method and featuring excellent heat conduction. It has the advantage of having small deviations in the Fe–Ni diffusion layers owing to a uniformity of temperature distribution in the stacked coil of steel sheet in the box annealing method.

Meanwhile, a steel sheet can also be plated directly after cold rolling, and then followed by heat treatment in this invention. In other words, annealing for re-crystallization of a base sheet and heat treating for diffusion is processed simultaneously. For instance, under a heat treatment at a temperature of 560° C. and a soaking time of 6 hours, a base sheet is re-crystallized and the diffusion layer of 2 μm can be formed on a base steel.

Skin Pass Rolled Process After Heat-treatment:

After heat treatment, in order to provide a surface finish as required and to improve mechanical properties such as the prevention of a break or a stretcher strain, a steel strip may be subjected to a skin-pass rolling with an elongation of approximately 1 to 2%.

The present invention will now be explained in detail referring to the Examples below which show the preferred embodiments, (Examples 1–15) and comparative Examples (Examples 1–5). These Examples are for illustration purposes only and are not to be viewed as limiting the invention to the specific Examples.
(Example 1–16)

A base sheet is a low-carbon aluminum killed steel board (thickness: 0.25 mm) to which cold rolling and annealing have been applied. The chemical composition of the base sheet is as follows.

C: 0.045%, Mn: 0.23%, Si: 0.02%, P: 0.012%, S: 0.009%, Al: 0.063%, N: 0.0036%.

This base sheet was plated with nickel under the following conditions after alkali electrolytic degreasing and pickling with sulfuric acid soaking. The conditions of the sulfuric acid soaking is:

Density of sulfuric acid: 50 g/l, Bath temperature: 25° C. Soaking time: 20 sec.

The following Watt bath non-luster plating was adopted for the nickel plating. Only one side was processed each time.

Bath composition: nickel sulfate: 300 g/l, nickel chloride: 40 g/l, boric acid: 30 g/l, lauryl sulfate soda: 0.5 g/l, bath temperature: 55° C., pH: 4.3, current density: 10 A/dm² anode: nickel pellet We made 5 types of samples with the plating thickness of about 1, 2, 3, 4 and 5 μm by plating the steel sheets under the above-mentioned conditions.

In order to vary the thickness of the Fe–Ni diffusion layers, we heat-treated the samples by changing temperature and time in a furnace of HNX gas (dew-point temperature: −20° C.) consisting of 6.5% hydrogen. Table 1 shows the results, as well as the thickness of Fe–Ni diffusion layers, Fe/(Fe+Ni) ratios, salt spray corrosion resistance, and plating adhesiveness, and the like.

Moreover, adhesiveness between a plated layer and a base sheet cannot be obtained because a Fe–Ni diffusion layer is not generated to sufficient thickness. As a result, it is thought that falling of a plating layer occurs by powdering under the actual drawing. The results of the Examples (No. 18, 20, 21, 22, 25, 27) in Tables No. 1 and 2 indicated that corrosion resistance is degraded when a Fe–Ni diffusion layer becomes thick, and consequently, the Fe/(Fe+Ni) ratio exceeds 30%. This degradation of corrosion resistance occurs because when iron is over-diffused, the ratio of iron which appears on the surface increases, resulting in an increased number of rusting points.

As a summary of the results in Table 1, the oblique lined area of FIG. 1 shows a range where both corrosion resistance and plating adhesiveness are excellent.

TABLE 1

| Example No. | Coating thickness of Ni μm | Heat treatment Heat temp. °C. | Heat treatment Soaking time (hour) | Thickness of diffusion (μm) | Exposure ratio of Fe (%) | Salt spray test Planed part | Salt spray test Erichsen streched part | Plating adhesion Decreased weight | Plating adhesion Evaluation |
|---|---|---|---|---|---|---|---|---|---|
| 1 | 1.05 | 500 | 6.0 | 0.3 | 0 | ○ | ○ | 25 | ○ |
| 2 | 1.05 | 600 | 7.0 | 3.5 | 30 | ○ | ○ | 28 | ○ |
| 3 | 1.90 | 450 | 8.0 | 0.2 | 0 | ○ | ○ | 35 | ○ |
| 4 | 1.90 | 580 | 6.0 | 2.2 | 0 | ○ | ○ | 33 | ○ |
| 5 | 1.90 | 610 | 9.0 | 4.9 | 7 | ○ | ○ | 39 | ○ |
| 6 | 1.90 | 610 | 13.0 | 5.8 | 28 | ○ | ○ | 45 | ○ |
| 7 | 3.05 | 500 | 6.0 | 0.4 | 0 | ○ | ○ | 65 | ○ |
| 8 | 3.05 | 580 | 6.0 | 2.4 | 0 | ○ | ○ | 54 | ○ |
| 9 | 3.05 | 650 | 5.0 | 7.2 | 4 | ○ | ○ | 56 | ○ |
| 10 | 3.90 | 500 | 6.0 | 0.4 | 0 | ○–◎ | ○ | 69 | ○ |
| 11 | 3.90 | 650 | 8.0 | 10.3 | 14 | ○–◎ | ○ | 53 | ○ |
| 12 | 3.90 | 650 | 6.0 | 8.3 | 0 | ○–◎ | ○ | 48 | ○ |
| 13 | 3.90 | 650 | 10.0 | 10.9 | 25 | ○–◎ | ○ | 52 | ○ |
| 14 | 4.95 | 500 | 6.0 | 0.4 | 0 | ◎ | ◎ | 72 | ○ |
| 15 | 4.95 | 580 | 6.0 | 2.5 | 0 | ◎ | ◎ | 56 | ○ |
| 16 | 4.95 | 680 | 6.0 | 14.3 | 29 | ◎ | ◎ | 49 | ○ |

The above-mentioned salt spray test was conducted with 4 hour-spray time based on JIS Z-2371. The corrosion resistance of the flat parts and the 6 mm Erichsen part were evaluated by five ranks (◎: excellent, ○: good, Δ: fair, X: bad, XX: very bad).

Thirty drawing cans (bank diameter: 54 mm, outer diameter: 13 mm, height: 49 mm) were made from the samples by using a press machine. The plating adhesiveness was evaluated by total weight decrease of thirty samples after drawing. We measured the above-mentioned weights after removing drawing oil with acetone as well.

As Table 1 shows, both the corrosion resistance and the plating adhesiveness of the Examples No. 1–No. 16 within the range of this invention are satisfactory.

On the other hand, the comparative Examples No. 17–No. 27 which do not come under the range of this invention are not practical because either their salt spray corrosion resistance or their plating adhesiveness characteristics is poor.

As we mentioned earlier, the reason for this is that sufficient ductility cannot be obtained because recrystallization of a plated layer is not enough at that heat-treatment temperature.

(Example 28)

The same base sheet as described in Example 1–16 was electrolytically degreased, rinsed, and subsequently nickel strike plated under the following conditions:

Bath composition: nickel sulfate 150 boric acid 30 g/l, bath temperature: 45° C., pH: 1.5, current density: 15 A/dm², anode: nickel pellet, electric charge: 90 coulomb/dm².

After strike plating and being rinsed successively, a nickel plating with a coating thickness of 3 μm was carried out under the same conditions as in Example 1–16. After nickel plating, it was heat-treated at a temperature of 580° C. with a soaking time of 6 hours in a furnace using the same protection gas as described in Example 1–16, and followed by skin pass rolling with an elongation of 1.2%. The Fe–Ni diffusion layer obtained is 2.2. μm in thickness. The corrosion resistance at both a flat part and an Erichsen stretched part showed excellent rank (◎). As is evident from Table 3, corrosion resistance of example No. 28 was improved by the added process of nickel strike plating prior to nickel plating and when compared with Example No. 4, the thickness of the plating and Fe–Ni diffusion layer are the approximately the same as that of Example No. 28.

TABLE 2

| Comparative Example No. | Coating thickness or Ni μm | Heat treatment Heat temp. °C. | Heat treatment Soaking time (hour) | Thickness of diffusion (μm) | Exposure ratio of Fe (%) | Salt spray test Planed part | Salt spray test Erichsen streched part | Plating adhession Decreased weight | Plating adhession Evaluation |
|---|---|---|---|---|---|---|---|---|---|
| 17 | 1.05 | 400 | 0.0 | 0.0 | 0 | x | xx | 150 | x |
| 18 | 1.05 | 600 | 9.0 | 4.0 | 35 | Δ | x | 30 | ○ |
| 19 | 1.90 | 100 | 0.0 | 0.0 | 0 | Δ | x | 182 | x |
| 20 | 1.00 | 610 | 15.0 | 0.3 | 33 | ○ | Δ | 46 | ○ |
| 21 | 1.90 | 650 | 6.0 | 8.2 | 72 | Δ | Δ | 64 | ○ |
| 22 | 3.05 | 400 | 6.0 | 0.0 | 0 | ○ | Δ | 152 | x |
| 23 | 3.05 | 650 | 8.0 | 0.2 | 35 | ○ | Δ | 48 | ○ |
| 24 | 3.90 | 400 | 6.0 | 0.0 | 0 | ○ | Δ | 125 | x |
| 25 | 3.90 | 650 | 15.0 | 12.7 | 42 | ○ | Δ | 63 | ○ |
| 28 | 4.95 | 680 | 7.0 | 14.0 | 34 | ○ | Δ | 63 | ○ |
| 27 | 1.95 | 680 | 10.0 | 17.0 | 51 | ○ | Δ | 65 | ○ |

(Example 29)

The same base sheet as described in Example 1–16 was electrolytically degreased, rinsed, then nickel-cobalt alloy plated under the following conditions.

Bath composition: nickel sulfate: 150 g/l, cobalt sulfate: 10 g/l, boric acid: 30 g/l, bath temperature: 45° C., pH: 1.4, current density: 15 A/dm$^2$, anode: electrolysis nickel pellet, electric charge: 90 coulomb/dm$^2$.

TABLE 3

| Example No. | Coating thickness of Ni μm | Heat treatment Heat temp. °C. | Heat treatment Soaking time (hour) | Thickness of diffusion layer (μm) | Eexposure ratio of Fe (%) | Salt spray test Planed part | Salt spray test Erichsen streched part | |
|---|---|---|---|---|---|---|---|---|
| 28 | 3.0 | 580 | 6.0 | 2.2 | 0 | ⊙ | ⊙ | nickel-strike plating |
| 29 | 3.0 | 580 | 6.0 | 2.5 | 0 | ⊙ | ⊙ | nickel-cobalt strike plating |

After strike plating, a base sheet was rinsed and nickel plated under the same conditions as in Example No. 28. The nickel plating obtained is 3.0 μm in thickness. After nickel plating, it was heat-treated at a temperature of 580° C. with a soaking time of 6 hours in a furnace using the same protection gas as described for Example No. 1–16, and subsequently skin pass rolled with an elongation of 1.2%. A Fe–Ni diffusion layer 2.5 μm in thickness was obtained. As shown for Example 29 in Table 3, the corrosion resistance of both a flat part and an Erichsen stretched part showed excellent rank (⊙, indicating that a nickel-cobalt alloy strike plating improves corrosion resistance.

In summary, the results with the preferred embodiments and comparative Examples demonstrate that a nickel plated steel sheet or strip of this invention possesses excellent corrosion resistance and plating adhesiveness, which are not achieved in the conventional technology, by specifying a relationship between the thickness of the diffusion layer and the thickness of nickel plating.

Furthermore, a pre-treatment of nickel strike plating or nickel-cobalt strike plating prior to a subsequent nickel plating has an effect of improving plating adhesiveness and of decreasing pin-holes in a plated layer.

What we claim is:

1. A corrosion-resistant steel sheet or strip comprising a base sheet made of a cold rolled steel sheet or strip and a diffusion layer consisting essentially of iron and nickel and having a thickness in the range of 0.3 to 10.9 μm on at least one surface of said base sheet as a top exposed layer, wherein said diffusion layer being formed by recrystallizing a nickel layer which has been electroplated on at least one surface of said base sheet;

said nickel layer having a thickness in the range of about 1 to 5 μm prior to forming said diffusion layer;

a ratio of said thickness of said diffusion layer to said thickness of said nickel layer prior to forming said diffusion layer being in the range of 10 to 333%;

an iron exposure rate at the top surface of the top exposed layer is in the range of 4% to 30%.

2. A corrosion-resistant steel sheet or strip according to claim 1, wherein said Fe–Ni diffusion layer has a thickness in the range of 0.3–10.3 μm.

3. A corrosion-resistant steel sheet or strip according to claim 1, wherein said iron exposure rate is in the range of 4% to 28%.

* * * * *

UNITED STATES PATENT AND TRADEMARK OFFICE
CERTIFICATE OF CORRECTION

PATENT NO. : 5,587,248
DATED : December 24, 1996
INVENTOR(S) : Hitoshi Ohmura, et al.

It is certified that error appears in the above-indentified patent and that said Letters Patent is hereby corrected as shown below:

Column 1, line 5, delete "2,116,750" and insert therefor --2,115,750--;

Column 2, line 51, delete "ration" and insert therefor --ratio--;

Column 4, line 21, delete "maximumplating" and insert therefor --maximum plating--;

Column 5, line 11, delete "lead" and insert --leads--;

Column 7, line 4, after "A/dm$^2$" insert --,--;

Column 7, line 49, delete "49 mm" and insert therefor --49mm--;

Column 8, line 47, delete "150 boric" and insert therefor --150 g/l, boric--;

Column 8, line 59, delete "2.2." and insert --2.2--;

UNITED STATES PATENT AND TRADEMARK OFFICE
CERTIFICATE OF CORRECTION

PATENT NO. : 5,587,248
DATED : December 24, 1996
INVENTOR(S) : Hitoshi Ohmura, et al.

It is certified that error appears in the above-indentified patent and that said Letters Patent is hereby corrected as shown below:

Column 9, Table 2, first column, under Example No., delete "28" and insert therefor --26--.

Signed and Sealed this

Twentieth Day of May, 1997

Attest:

BRUCE LEHMAN

Attesting Officer

Commissioner of Patents and Trademarks